US006909071B2

(12) United States Patent
Shozo (10) Patent No.: US 6,909,071 B2
(45) Date of Patent: Jun. 21, 2005

(54) OVERHEATED STEAM OVEN AND METHOD OF CONTROLLING THE SAME

(75) Inventor: Kobayashi Shozo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/841,489

(22) Filed: May 10, 2004

(65) Prior Publication Data

US 2005/0056634 A1 Mar. 17, 2005

(30) Foreign Application Priority Data

Sep. 15, 2003 (KR) ............................... 10-2003-0063745

(51) Int. Cl.[7] ................................................ A21B 1/08
(52) U.S. Cl. ...................... 219/401; 219/400; 219/402; 392/394; 392/397; 392/398; 126/369; 126/369.1; 126/348; 99/467; 99/473
(58) Field of Search ................................ 219/400–401, 219/407; 392/394, 397–98, 401–2; 126/369, 369.1, 369.2, 348; 99/467–468, 473–474

(56) References Cited

U.S. PATENT DOCUMENTS

| 3,639,725 | A | * | 2/1972 | Maniscalco | ................. 219/401 |
|---|---|---|---|---|---|
| 4,449,026 | A | | 5/1984 | Satoh | |
| 5,158,064 | A | * | 10/1992 | Willis et al. | ................... 126/20 |
| 5,649,476 | A | * | 7/1997 | Montagnino et al. | ......... 99/415 |
| 5,786,577 | A | | 7/1998 | Han et al. | |
| 6,157,006 | A | * | 12/2000 | Sickles et al. | .............. 219/401 |

FOREIGN PATENT DOCUMENTS

| JP | 5-256455 | 10/1993 |
|---|---|---|
| JP | 2001-355844 | 12/2001 |
| JP | 2002-71138 | 3/2002 |

* cited by examiner

Primary Examiner—Shawntina Fuqua
(74) Attorney, Agent, or Firm—Staas & Halsey LLP (57) ABSTRACT

An overheated steam oven which cleans an interior of a cooking cavity of the overheated steam oven using hot water and overheated steam, and executes a cooking operation using the overheated steam. The overheated steam oven includes a cabinet to define the cooking cavity therein, an overheated steam generator to supply overheated steam into the cooking cavity, and a cleaning unit to spray water from an interior of the overheated steam generator into the cooking cavity to clean the interior of the cooking cavity. A control method of the overheated steam oven includes spraying the water into the cooking cavity by use of the cleaning unit in response to a cleaning start signal, thus cleaning the interior of the cooking cavity, and supplying the overheated steam from the overheated steam generator into the cooking cavity after the cooking cavity is cleaned, thus drying the interior of the cooking cavity.

30 Claims, 6 Drawing Sheets

OVERHEATED STEAM OVEN AND METHOD OF CONTROLLING THE SAME

CROSS-REFERENCE TO RELATED APPLICATIONS

This application claims the benefit of Korean Patent Application No. 2003-63745, filed on Sep. 15, 2003 in the Korean Intellectual Property Office, the disclosure of which is incorporated herein by reference.

BACKGROUND OF THE INVENTION

1. Field of the Invention

The present invention relates, in general, to overheated steam ovens and methods of controlling the overheated steam ovens and, more particularly, to an overheated steam oven and a method of controlling the overheated steam oven to clean an interior of a cooking cavity of the overheated steam oven using hot water and overheated steam.

2. Description of the Related Art

Generally, an overheated steam oven is a cooking apparatus to heat and cook food placed in a cooking cavity thereof using heat of overheated steam discharged from an overheated steam generator into the cooking cavity. Since the overheated steam discharged from the overheated steam generator into the cooking cavity heats the food, the overheated steam oven evenly heats and cooks the food, which is different from other types of cooking apparatuses. Thus, the overheated steam oven prevents the food from being partially burned. Furthermore, the overheated steam oven easily controls a cooking temperature in the cooking cavity by controlling a temperature and a volume of the overheated steam discharged into the cooking cavity. Since oxidation of the food does not occur, the overheated steam oven has an advantage in that the cooked food has a better taste.

However, in the conventional overheated steam oven, which cooks food placed in the cooking cavity thereof, it is problematic in that the inner surface of the cooking cavity is contaminated by the food, because parts of the food drop below into the cooking cavity when users place and remove the food into and from the cooking cavity, or the food contained in cooking vessels placed in the cooking cavity boils over during cooking operations. Accordingly, the users must sometimes clean the inner surface of the cooking cavity of the overheated steam oven to maintain a cleanness of the cooking cavity of the overheated steam oven. However, in the conventional overheated steam oven, because the food contaminating the cooking cavity is dried and stuck on the inner surface of the cooking cavity by heat of the overheated steam, it is problematic in that the users may have a difficult time removing the parts of the food which drop below into the cooking cavity, while cleaning the inner surface of the cooking cavity of the conventional overheated steam oven.

SUMMARY OF THE INVENTION

Accordingly, it is an aspect of the present invention to provide an overheated steam oven and a method of controlling the overheated steam oven, which cleans an interior of a cooking cavity of the overheated steam oven using hot water and overheated steam, when necessary, as well as executing an original function of the overheated steam oven which is a cooking operation using the overheated steam.

Additional aspects and/or advantages of the invention will be set forth in part in the description which follows and, in part, will be obvious from the description, or may be learned by practice of the invention.

The foregoing and/or other aspects are achieved by providing an overheated steam oven comprising a cabinet to define a cooking cavity therein, an overheated steam generator to supply overheated steam into the cooking cavity, and a cleaning unit to spray water from an interior of the overheated steam generator into the cooking cavity to clean an interior of the cooking cavity.

The cleaning unit sprays the water heated by the overheated steam generator into the cooking cavity.

The cleaning unit comprises a plurality of spray nozzles provided in the cooking cavity, a feed pipe to connect a first drain hole provided on the overheated steam generator to the plurality of spray nozzles, and a feed pump mounted to a predetermined portion of the feed pipe to feed the water from the overheated steam generator to the plurality of spray nozzles through the feed pipe.

The overheated steam generator comprises a steam generating vessel having an outlet connected to the cooking cavity and a predetermined amount of water contained in the steam generating vessel, a first heater mounted to a lower portion of the steam generating vessel, and a second heater mounted to an upper portion in the steam generating vessel to overheat steam generated by the first heater.

The steam generating vessel further comprises an insulating vessel.

The steam generating vessel further comprises an inner vessel which contains the first heater and the second heater therein, and an outer vessel which surrounds an outer surface of the inner vessel and is spaced apart from the outer surface of the inner vessel, wherein a space between the inner vessel and the outer vessel is maintained in a vacuum state.

The steam generating vessel further comprises a feed hole to supply water from an external water source into an interior of the steam generating vessel, and a first drain hole to supply the water from the interior of the steam generating vessel to the cleaning unit.

The cleaning unit may comprise a plurality of spray nozzles provided in the cooking cavity, a feed pipe to connect the first drain hole of the steam generating vessel to the plurality of spray nozzles, and a feed pump mounted to a predetermined portion of the feed pipe to feed the water from the interior of the steam generating vessel to the plurality of spray nozzles through the feed pipe.

The overheated steam oven further comprises a water supply pipe extending from the external water source to the feed hole of the steam generating vessel, and a control valve mounted to the water supply pipe to control supplying of the water fed from the external water source into the steam generating vessel.

The overheated steam oven further comprises a water level sensor installed in the steam generating vessel to monitor a level of the water contained in the steam generating vessel, and a water temperature sensor installed in the steam generating vessel to monitor a temperature of the water contained in the steam generating vessel.

The overheated steam oven further comprises an inlet steam temperature sensor mounted to a steam inlet port which is provided on the cooking cavity and is connected to the overheated steam generator, to monitor a temperature of the overheated steam supplied into the cooking cavity through the steam inlet port.

The overheated steam oven further comprises an exhaust path provided at an upper portion in the cooking cavity to discharge steam from the cooking cavity to an outside of the cooking cavity, and an outlet steam temperature sensor provided in the exhaust path to monitor a temperature of the steam discharged from the cooking cavity to the outside of the cooking cavity.

The overheated steam oven further comprises a drain pipe connected to a lower portion of the cooking cavity to drain the water from the cooking cavity to an outside of the cooking cavity, and a drain pump mounted to the drain pipe.

It is another aspect of the present invention to provide a method of controlling an overheated steam oven having a cabinet to define a cooking cavity therein, an overheated steam generator to supply overheated steam into the cooking cavity, and a cleaning unit to spray water from an interior of the overheated steam generator into the cooking cavity to clean an interior of the cooking cavity, the method comprising spraying the water into the cooking cavity by use of the cleaning unit in response to a cleaning start signal and cleaning the interior of the cooking cavity by use of the water, and supplying the overheated steam from the overheated steam generator into the cooking cavity after the interior of the cooking cavity is cleaned by the water and drying the interior of the cooking cavity by use of the overheated steam.

The method further comprises informing a user of an execution of a cleaning-mode operation when the spraying of the water into the cooking cavity is started in response to the cleaning start signal.

The method further comprising supplying steam into the cooking cavity and cleaning the interior of the cooking cavity by use of the steam, prior to the cleaning of the interior of the cooking cavity by use of the water.

During the cleaning of the interior of the cooking cavity by use of the steam, a temperature of the steam supplied into the cooking cavity may be controlled to be maintained within a predetermined reference range, such that a heater of the overheated steam generator is operated when the temperature of the steam is lower than the predetermined reference range, and the heater of the overheated steam generator is stopped when the temperature of the steam is higher than the predetermined reference range.

During the cleaning of the interior of the cooking cavity by use of the steam, the predetermined reference range of the steam is set to approximately 100° C.~110° C.

In the method of the present invention, the cleaning of the interior of the cooking cavity by use of the water is executed when a temperature of the water in the overheated steam generator is equal to or higher than a predetermined reference, and a heater of the overheated steam generator is operated when the temperature of the water in the overheated steam generator is lower than the predetermined reference.

During the cleaning of the interior of the cooking cavity by use of the water, the predetermined reference of the water is set to approximately 60° C.

During the drying of the interior of the cooking cavity by use of the overheated steam, a heater of the overheated steam generator supplies the overheated steam which has a temperature equal to or higher than a predetermined reference, into the cooking cavity.

During the drying of the interior of the cooking cavity by use of the overheated steam, the predetermined reference of the overheated steam is set to approximately 200° C.

In the method of the present invention, the cleaning start signal is input when a cleaning key provided on the cabinet is pressed for at least a predetermined period of time.

In the method of the present invention, the cleaning start signal is input when a cleaning key provided on the cabinet is repeatedly pressed at least a predetermined number of times.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below to explain the present invention by referring to the figures.

Figure 1:
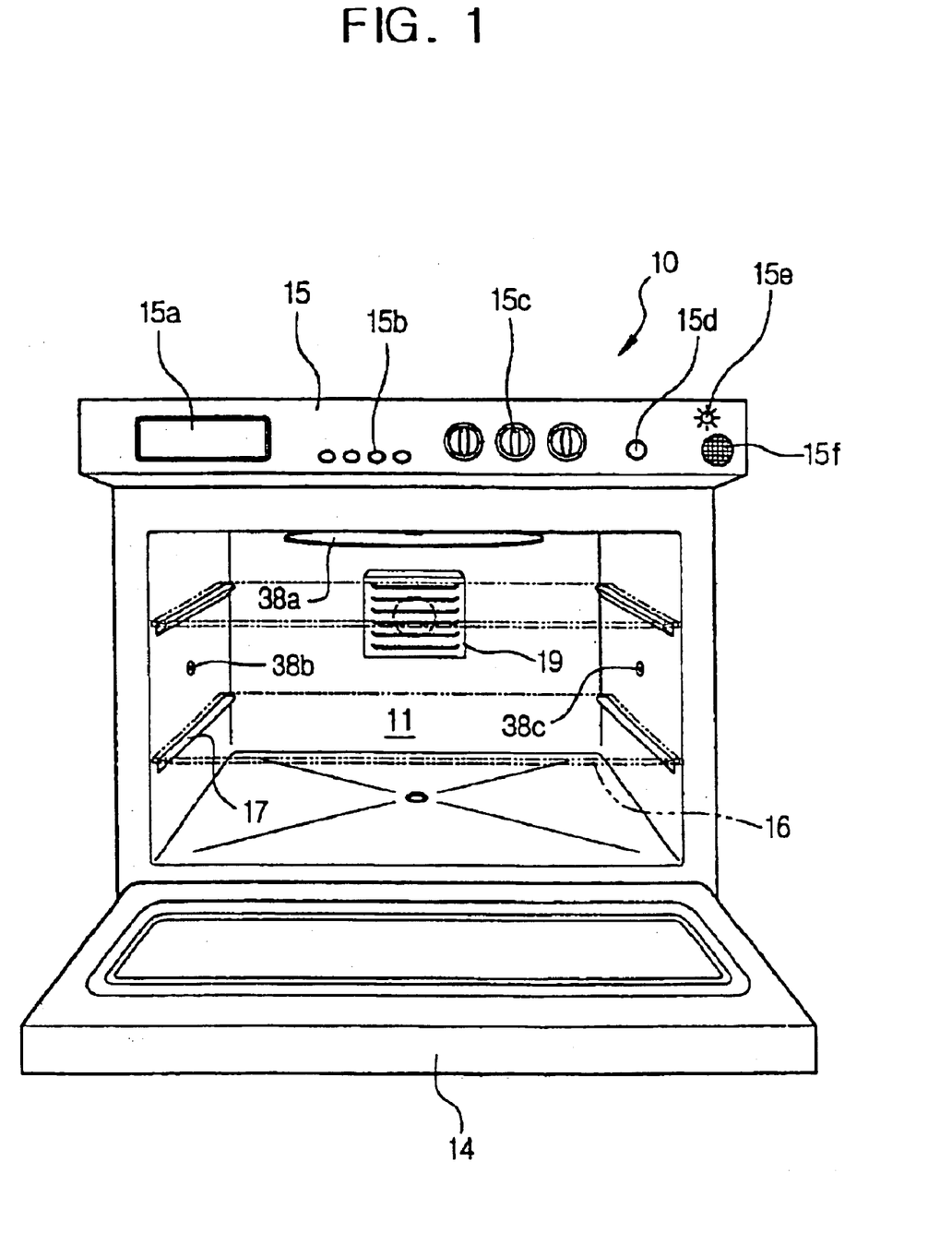
FIG. 1 is a perspective view of an overheated steam oven, according to an embodiment of the present invention.
Figure 2:
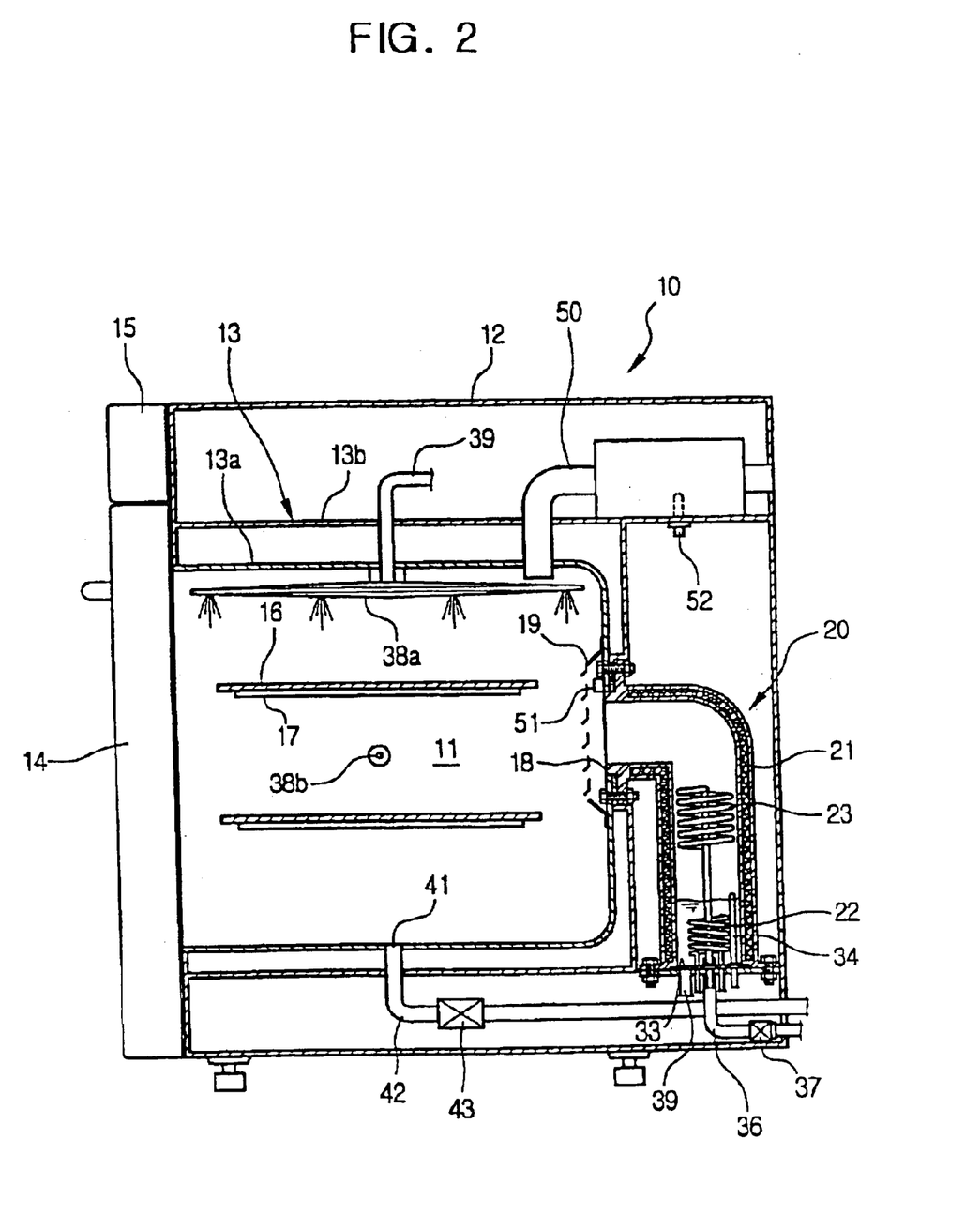
FIG. 2 is a sectional view showing an internal construction of the overheated steam oven of FIG. 1.

FIGS. 1 and 2 are views of an overheated steam oven, according to an embodiment of the present invention. In FIGS. 1 and 2, the overheated steam oven according to the present invention comprises a cabinet 10 to define a cooking cavity 11 therein, and an overheated steam generator 20 which is mounted to a rear wall in the cabinet 10 to supply overheated steam into the cooking cavity 11.

The cabinet 10 comprises an outer casing 12, and an inner casing 13 which is installed in the outer casing 12 to be spaced apart from the outer casing 12, to define the cooking cavity 11 therein, wherein the cooking cavity 11 is open at a front thereof to place and remove foods into and from the cooking cavity 11. The inner casing 13 comprising a first casing 13a and a second casing 13b which are spaced apart from each other to insulate the cooking cavity 11 from an outside of the cooking cavity 11.

The overheated steam oven further comprises a door 14 and a control panel 15, wherein the door 14 is attached to the open front of the cabinet 10 to be opened downward and closed upward, allowing a user to open and close the cooking cavity 11. The control panel 15 is provided at a predetermined portion of the cabinet 10 above the door 14, and comprises a display 15a to display an operational state of the overheated steam oven thereon, various kinds of control keys 15b and control switches 15c to input various kinds of cooking modes, a cleaning key 15d to control a cleaning operation, and an alarm unit having an alarm lamp 15e and an alarm speaker 15f to inform the user of an execution of the cleaning operation through alarm light and/or alarm voice.

Upper and lower racks 16 are provided at upper and lower portions in the cooking cavity 11 to respectively support foods thereon. Each of the upper and lower racks 16 is installed in the cooking cavity 11 along guide rails 17 which are oppositely formed on the inner surfaces of both sidewalls of the inner casing 13.

Figure 3:
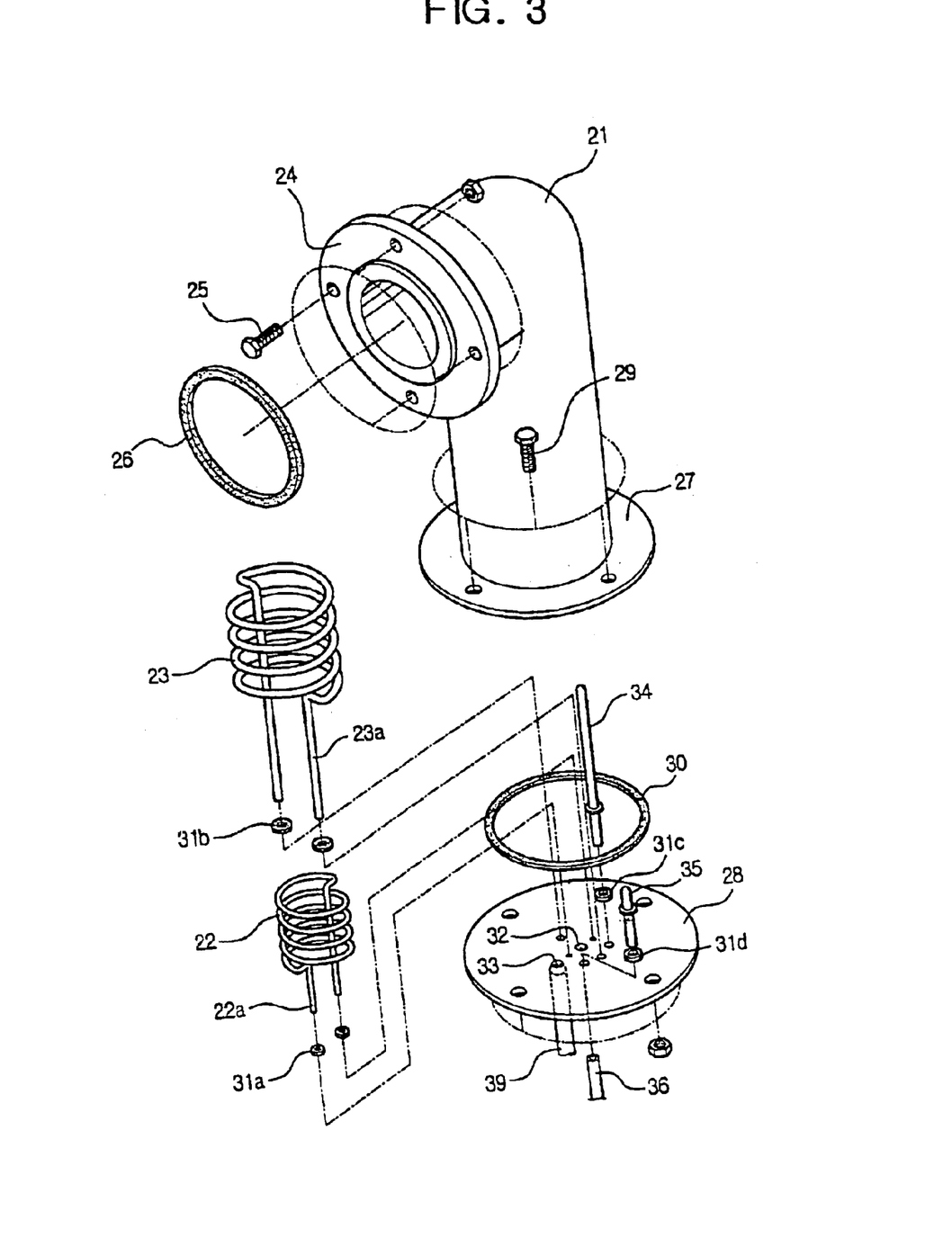
FIG. 3 is an exploded perspective view showing a construction of an overheated steam generator of the overheated steam oven of FIG. 2.

In FIGS. 2 and 3, the overheated steam generator 20, which is provided on the rear wall of the cooking cavity 11, comprises a steam generating vessel 21 having an outlet connected to a steam inlet port 18 provided on the rear wall of the cooking cavity 11 and a predetermined amount of water contained in the steam generating vessel 21. The overheated steam generator 20 further comprises a first heater 22 which is mounted to a lower portion in the steam generating vessel 21, and a second heater 23 which is mounted to an upper portion in the steam generating vessel 21.

Figure 4:
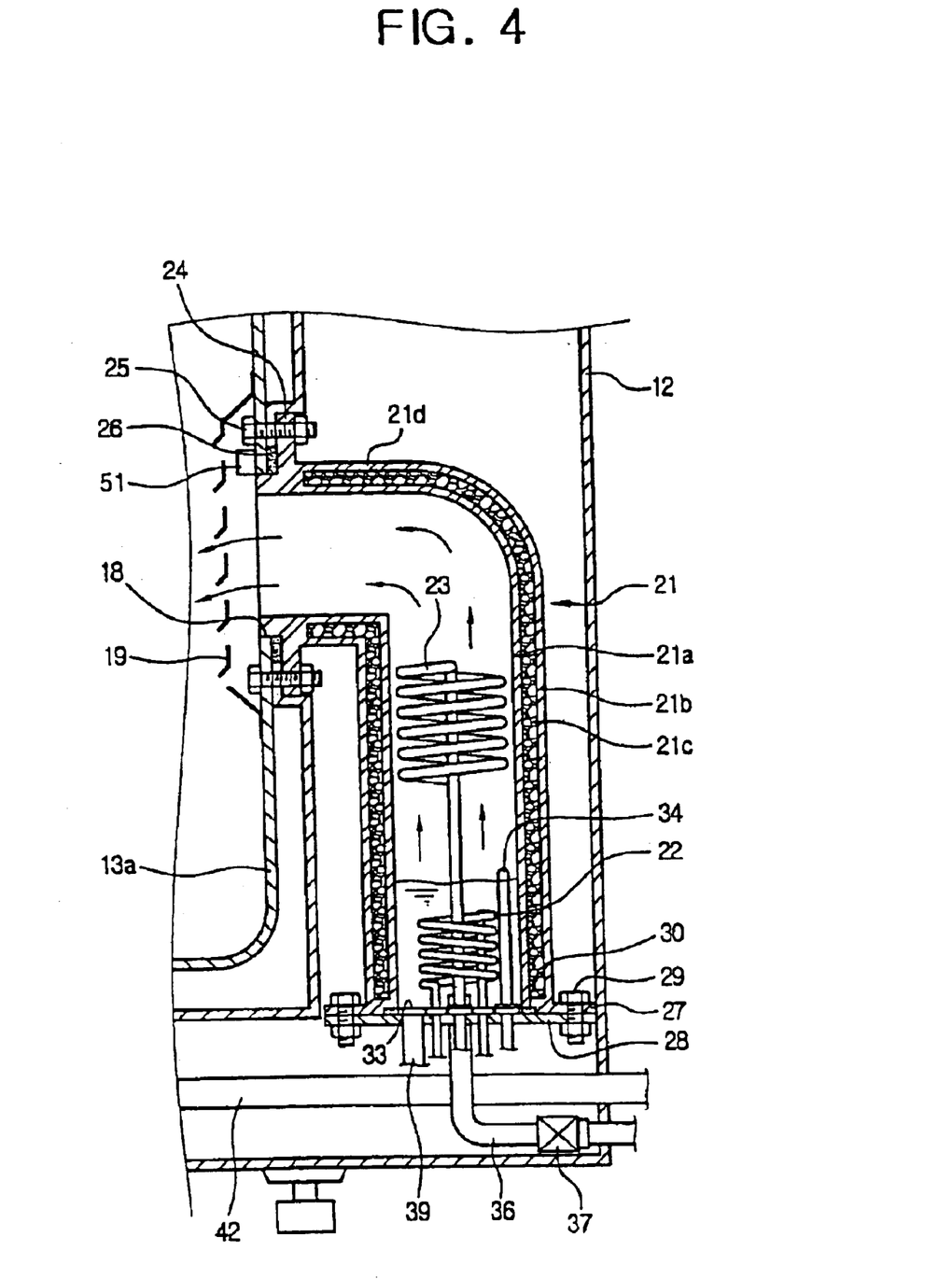
FIG. 4 is a sectional view showing the construction of the overheated steam generator of the overheated steam oven of FIG. 2.

In FIGS. 3 and 4, the steam generating vessel 21 comprises a vacuum insulating vessel, wherein a space is defined therein is insulated from an outside thereof, minimizing heat loss. The steam generating vessel 21 further comprises an inner vessel 21a, and an outer vessel 21b which surrounds an outer surface of the inner vessel 21a and is spaced apart from the outer surface of the inner vessel part 21a. The steam generating vessel 21 further comprises a shielding material 21c which fills a space between the inner vessel 21a and the outer vessel 21b, to intercept radiant heat originating from an interior of the steam generating vessel 21. The space between the inner vessel 21a and the outer vessel 21b is sealed in a vacuum state, when the vacuum state is induced.

The steam generating vessel 21 further comprises a bent part 21d which is formed by bending an upper end of the steam generating vessel 21 toward the rear wall of the cooking cavity 11, wherein the bent part 21d is connected at a front end thereof on the outlet of the steam generating vessel 21, to the steam inlet port 18 provided on the rear wall of the cooking cavity 11. An upper flange 24, which is provided around the outlet of the steam generating vessel 21, is mounted to a predetermined portion of the inner casing 13 around the steam inlet port 18 by a plurality of locking members 25 having a first packing 26 interposed between the upper flange 24 and the inner casing 13 to prevent a leakage of steam. A cover 19 having a plurality of steam discharging holes, is mounted to an inner surface of the rear wall of the cooking cavity 11, wherein the overheated steam flows from the overheated steam generator 20 into the cooking cavity 11.

The steam generating vessel 21 further comprises a lower flange 27 and a lower plate 28, wherein the lower flange 27 is provided around an edge of a lower end of the steam generating vessel 21 and the lower plate 28 is mounted to the lower flange 27 by a plurality of locking members 29 to close an opening of the lower end of the steam generating vessel 21. A second packing 30 is interposed between the lower plate 28 and the lower flange 27 to prevent a leakage of water from the steam generating vessel 21.

In FIG. 3, the first heater 22, mounted to the lower portion in the steam generating vessel 21, and the second heater 23, mounted to the upper portion in the steam generating vessel 21, each have a spiral shape to maximize a heat transferring surface area. First and second terminals 22a and 23a, which are respectively provided at the first and second heaters 22 and 23, are extended downward, and are supported by the lower plate 28. Accordingly, the first and second heaters 22 and 23 are supported on the lower plate 28. Also, third and fourth packings 31a and 31b each are respectively interposed between the first and second terminals 22a and 23a of the first and second heaters 22 and 23 and the lower plate 28 to prevent the leakage of water from the steam generating vessel 21. When the predetermined amount of water is fed into the steam generating vessel 21, the first heater 22, provided at the lower portion of the steam generating vessel 21, is immersed in the water contained in the steam generating vessel 21, and the second heater 23, provided at the upper portion of the steam generating vessel 21, is placed above the water contained in the steam generating vessel 21 and reaches a maximum water level. The overheated steam is generated by allowing the second heater 23 to further heat the steam generated by an operation of the first heater 22 while the steam rises toward the outlet of the steam generating vessel 21.

The overheated steam generator 20 further comprises a feed hole 32 and a first drain hole 33 formed on the lower plate 28 of the steam generating vessel 21 to feed and drain the water into and from the steam generating vessel 21 respectively. Furthermore, a water level sensor 34 and a water temperature sensor 35 to respectively monitor a level and a temperature of the water contained in the steam generating vessel 21 are mounted to the lower plate 28 of the steam generating vessel 21. A fifth packing 31c is provided between the water level sensor 34 and the lower plate 28 to prevent the leakage of water from the steam generating vessel 21. A sixth packing 31d is provided between the water temperature sensor 35 and the lower plate 28 to prevent the leakage of water from the steam generating vessel 21.

Figure 5:
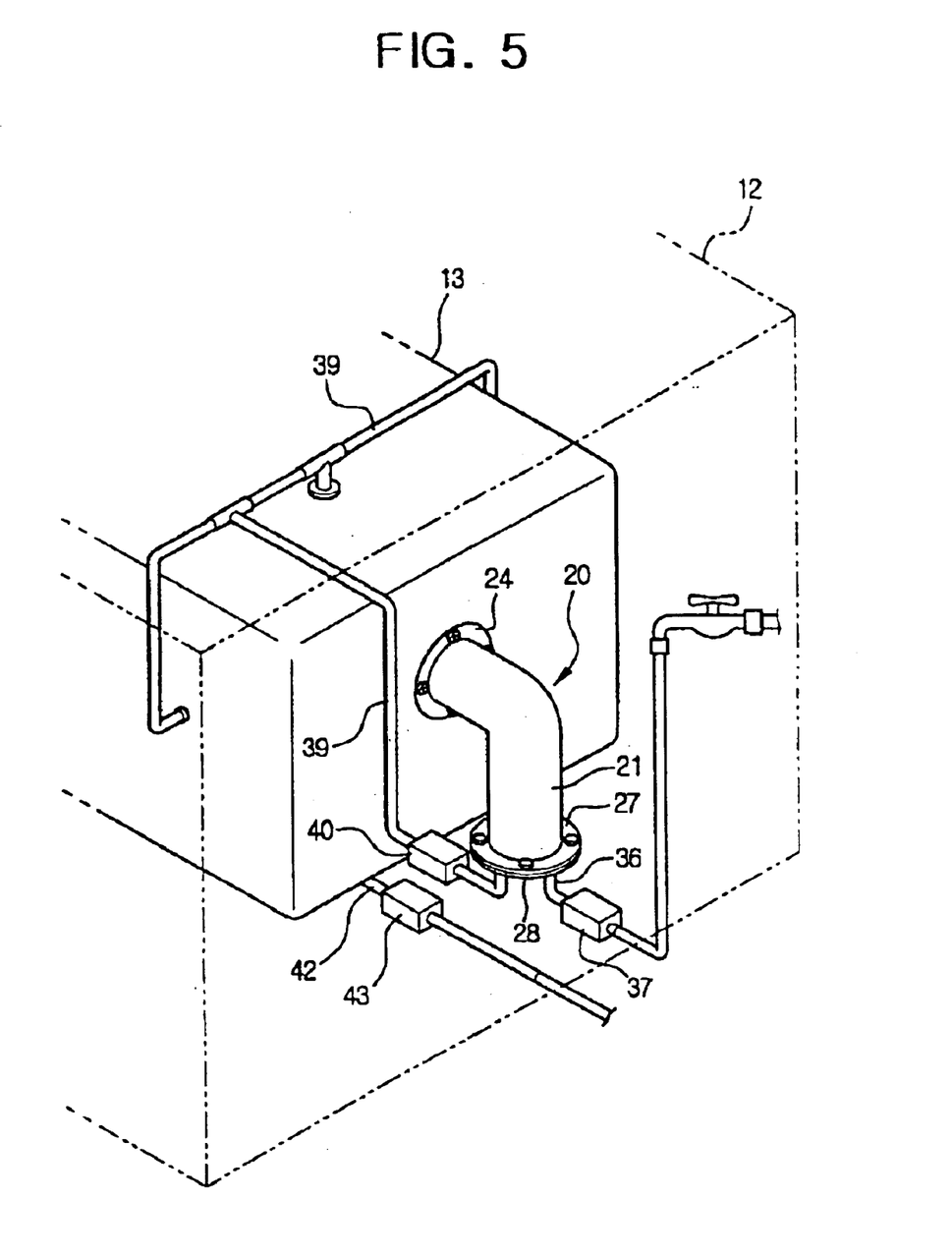
FIG. 5 is a perspective view of a cleaning unit of the overheated steam oven of FIG. 2.

In FIGS. 4 and 5, the water supply pipe 36 is connected to the feed hole 32 of the lower plate 28 to feed the water from an external water source (not shown) to the interior of the steam generating vessel 21. A control valve 37 is mounted to a predetermined portion of the water supply pipe 36 to control supplying of the water fed from the external water source into the steam generating vessel 21. The control valve 37 is installed in the outer casing 12 of the cabinet 10.

The overheated steam oven further comprises a cleaning unit to clean the interior of the cooking cavity 11 using the water contained in the steam generating vessel 21 after executing a cooking operation, and a drain unit to drain the water from the interior of the cooking cavity 11 to the outside of the cooking cavity 11.

In FIGS. 1, 2, and 5, the cleaning unit comprises a plurality of spray nozzles 38a, 38b and 38c provided in the cooking cavity 11, a feed pipe 39 which connects the first drain hole 33 of the steam generating vessel 21 to the plurality of spray nozzles 38a, 38b and 38c, and a feed pump 40 mounted to a predetermined portion of the feed pipe 39 to feed the water from the steam generating vessel 21 to the plurality of spray nozzles 38a, 38b and 38c through the feed pipe 39. Also, the rotary-type spray nozzle 38a of the plurality of spray nozzles 38a, 38b and 38c is mounted to an upper portion of the cooking cavity 11, and the other spray nozzles 38b and 38c which are the fixed-type spray nozzles, are respectively mounted to both sidewalls of the cooking cavity 11.

In FIG. 5, the feed pipe 39 extends from the first drain hole 33 of the steam generating vessel 21 to an outside of an upper wall of the inner casing 13 of the cooking cavity 11, at which a plurality of branch pipes branch from the feed pipe 39 to the plurality of spray nozzles 38a, 38b and 38c, respectively, to feed the water from the steam generating vessel 21 to each of the plurality of spray nozzles 38a, 38b and 38c through the feed pipe 39 having the branch pipes. The feed pipe 40 is mounted to the lower end of the steam generating vessel 21, wherein a considerable amount of water remains in the feed pipe 40 even when the steam generating vessel 21 is emptied. In FIG. 2, the drain unit comprises a drain pipe 42 extending from a second drain hole 41 provided on a lower portion of the cooking cavity 11 to the outside of the cabinet 10, and a drain pump 43 mounted to a predetermined portion of the drain pipe 42.

In FIG. 2, the overheated steam oven of the present invention further comprises an exhaust duct 50 at an upper portion in the cooking cavity 11 to discharge the steam from the cooking cavity 11 to the outside of the cooking cavity 11. The overheated steam oven further comprises an inlet steam temperature sensor 51 and an outlet steam temperature sensor 52. The inlet steam temperature sensor 51 is installed inside the cover 19 which covers the steam inlet port 18, to monitor a temperature of the overheated steam discharged from the steam generating vessel 21 into the cooking cavity 11 through the steam inlet port 18. The outlet steam temperature sensor 52 is installed in the exhaust duct 50 to monitor a temperature of the steam discharged from the cooking cavity 11 to the outside of the cooking cavity 11.

The operation and effect of the overheated steam oven of the present invention will be described herein below.

First, foods are placed on the upper and lower racks 16 of the cooking cavity 11. Thereafter, the overheated steam oven is operated and the water is fed from the external water source into the steam generating vessel 21 of the overheated steam generator 20 through the feed pipe 32. The water level in the steam generating vessel 21 is controlled by operating the control valve 34 in response to the monitoring operation of the water level sensor 34.

After the predetermined amount of water is fed into the steam generating vessel 21, the water in the steam generating vessel 21 is heated by the first heater 22 to generate steam. The steam is generated by boiling the water, which is contained in the lower portion of the steam generating vessel 21, by the first heater 22 immersed in the water. The steam generated by the first heater 22 rises in the steam generating vessel 21, thus being further heated by the second heater 23 to produce overheated steam. The overheated steam is then supplied into the cooking cavity 11 through the outlet of the steam generating vessel 21. The foods in the cooking cavity 11 are then cooked by the heat of the overheated steam. After the cooking operation is finished, the steam is discharged from the cooking cavity 11 to the outside of the cooking cavity 11 through the exhaust duct 50 provided at the upper portion of the cooking cavity 11.

During the above-mentioned cooking operation, the overheated steam oven of the present invention produces overheated steam while minimizing heat loss, because the steam generating vessel 21 has the insulating construction and the outlet of the steam generating vessel 21 is mounted to the rear wall of the cooking cavity 11. Since the overheated steam oven rapidly supplies the overheated steam into the cooking cavity 11, the energy loss is further minimized. Also, since the first heater 22 is immersed in the water contained in the steam generating vessel 21, the overheated steam oven rapidly boils the water in the steam generating vessel 21. Furthermore, because the steam produced by the first heater 22 is further heated by the second heater 23, the overheated steam oven of the present invention produces the overheated steam within a short period of time while reducing energy requirements.

Figure 6:
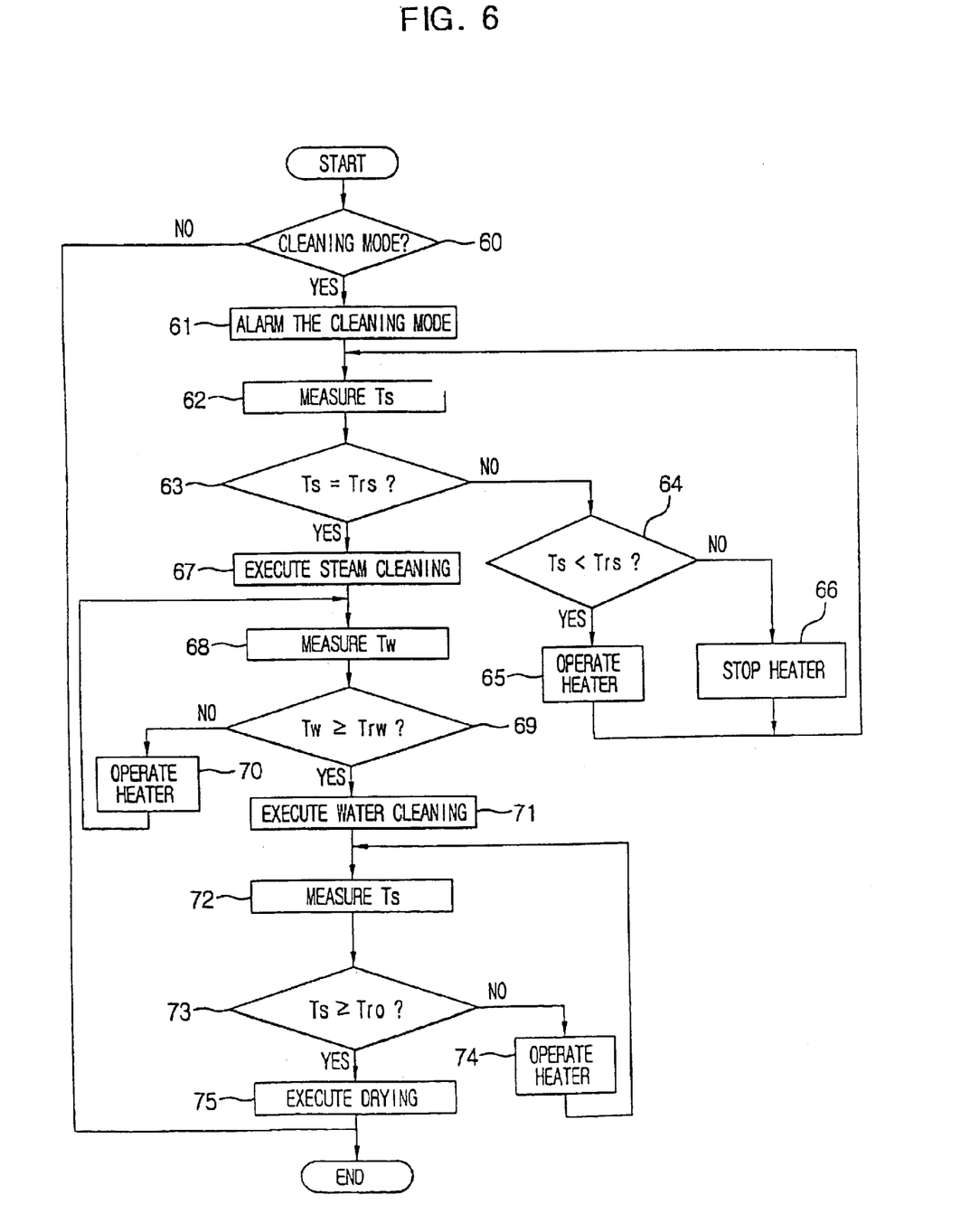
FIG. 6 is a flowchart showing a method of controlling a cleaning-mode operation of the overheated steam oven of FIG. 1.

When the user desires to clean the interior of the cooking cavity 11 after the cooking operation is completed, the user operates the cleaning key 15d of the control panel 15, to execute the cleaning operation to clean the interior of the cooking cavity 11, according to a preset cleaning program. As shown in FIG. 6, the cleaning-mode operation to clean the interior of the cooking cavity 11 comprises a steam cleaning process to clean the cooking cavity 11 by use of steam, a hot water cleaning process to clean the cooking cavity 11 by spraying hot water which is supplied from the steam generating vessel 21 into the cooking cavity 11, and a drying process to dry the cooking cavity 11 by use of overheated steam.

The method of controlling the overheated steam oven to clean the interior of the cooking cavity 11 will be described in detail herein below.

During the cleaning-mode operation to clean the interior of the cooking cavity 11, a control unit (not shown) of the overheated steam oven determines whether a cleaning start signal has been input from the cleaning key 15d of the control panel 15 by a manipulation of the user in operation 60. The cleaning start signal is input to the control unit only when the user continuously presses the cleaning key 15d for at least a predetermined period of time or repeatedly presses the cleaning key 15d at least a predetermined number of times. Therefore, the control unit determines that the cleaning-mode operation must be started when the user continuously presses the cleaning key 15d for at least the predetermined period of time or repeatedly presses the cleaning key 15d at least the predetermined number of times.

When the cleaning-mode operation is executed, the control unit informs the user of the execution of the cleaning-mode operation by use of the alarm unit of the control panel 15 in operation 61. In the above state, the alarm unit informs the user of the execution of the cleaning-mode operation by producing flickering alarm light from the alarm lamp 15e and/or producing alarm voice from the alarm speaker 15f. The control unit informs the user of the execution of the cleaning operation by displaying letter information on the display 15a.

After the informing of the execution of the cleaning-mode operation has been performed in operation 61, the temperature Ts of the steam to be supplied into the cooking cavity 11 is measured by use of the inlet steam temperature sensor 51 in operation 62, and the control unit determines whether the temperature Ts of the steam is maintained within a predetermined reference range Trs (approximately 100° C.~110° C.), suitable for effectively executing the steam cleaning process, in operation 63, based on a signal output from the inlet steam temperature sensor 51. When the temperature Ts of the steam is maintained within the predetermined reference range Trs (approximately 100° C.~110° C.), the steam is supplied from the overheated steam generator 20 into the cooking cavity 11 to perform the steam cleaning process for a predetermined time period in operation 67. In the cleaning operation of the overheated steam oven, the steam cleaning process is performed to soak the parts of the food, which are stuck on the inner surface of the walls of the cooking cavity 11, in water by supplying the steam into the cooking cavity, allowing the parts of the food to be easily removed from the walls of the cooking cavity 11. However, when the temperature Ts of the steam is not maintained within the predetermined reference range Trs (approximately 100° C.~110° C.), the control unit determines whether the temperature Ts of the steam is lower than a lowest point (approximately 100° C.) of the predetermined reference range Trs (approximately 100° C.~110° C.), in operation 64. When the temperature Ts of the steam is lower than the lowest point (approximately 100° C.) of the predetermined reference range Trs, the first heater 22 of the overheated steam generator 20 is operated to boil the water in the steam generating vessel 21 in operation 65. However, when the control unit has determined, in operation 64, that the temperature Ts of the steam is higher than a highest point (approximately 110° C.) of the predetermined reference range Trs (approximately 100° C.~110° C.), the control unit stops the operation of the first heater 22 of the overheated steam generator 20 in operation 66, thus cooling the steam. The above-mentioned operations 62, 63, 64, 65 and 66 of the steam cleaning process are performed to supply the steam having appropriate temperatures, suitable for effectively executing the steam cleaning process, into the cooking cavity 11 even when the user starts the cleaning operation by manipulating the cleaning key 15d immediately after a cooking operation of the overheated steam oven finished the steam generating vessel 21 may produce extremely hot steam, or after a considerable time has passed since the finish of the cooking operation the steam generating vessel 21 may not produce any steam from the water contained therein and a sensed temperature of air in the steam generating vessel 21 is lower than approximately 100° C.

When the steam cleaning process is completed, the control unit measures a temperature Tw of the water in the steam generating vessel 21 by use of the water temperature sensor 35 in operation 68, and determines in operation 69 whether the measured temperature Tw of the water is equal to or higher than a predetermined reference Trw (approximately 60° C.) which is suitable for effectively executing the water cleaning process. When the measured temperature Tw of the water is equal to or higher than the predetermined reference Trw (approximately 60° C.), the water cleaning process is executed for a predetermined time period in operation 71. However, when the measured temperature Tw of the water is lower than the predetermined reference Trw (approximately 60° C.), the control unit operates the first heater 22 of the steam generating vessel 21 in operation 70, heating the water contained in the steam generating vessel 21. During the water cleaning process, the hot water is pumped by the feed pump 40 to be forcibly fed through the feed pipe 39 from the steam generating vessel 21 to the plurality of spray nozzles 38a, 38b and 38c which are provided in the cooking cavity 11. The hot water is sprayed into the cooking cavity 11 from the plurality of spray nozzles 38a, 38b and 38c, thereby cleaning the interior of the cooking cavity 11. During the water cleaning process, the drain pump 43 is operated to drain the water from the cooking cavity 11 to the outside of the cabinet 10.

When the water cleaning process is completed, the temperature Ts of the steam to be supplied into the cooking cavity 11 is measured again by use of the inlet steam temperature sensor 51 in operation 72, and the control unit determines whether the temperature Ts of the steam is equal to or higher than a predetermined reference Tro (approximately 200° C.), suitable for effectively executing the drying process, in operation 73, based on a signal output from the inlet steam temperature sensor 51. That is, the control unit determines whether the steam is the overheated steam in operation 73. When the control unit determines that the steam is the overheated steam wherein the temperature Ts is equal to or higher than the predetermined reference Tro (approximately 200° C.), the overheated steam is continuously supplied into the cooking cavity 11 for a predetermined time period in operation 75 to execute the drying process to dry the cleaned interior of the cooking cavity 11 by use of the overheated steam. However, when the temperature Ts of the steam is lower than the predetermined reference Tro (approximately 200° C.), both the first heater 22 and the second heater 23 of the steam generating vessel 21 are operated in operation 74 to overheat the steam to produce the overheated steam, prior to supplying the overheated steam into the cooking cavity 11.

As apparent from the above description, the present invention provides an overheated steam oven and a method of controlling the overheated steam oven, which efficiently cleans an interior of a cooking cavity using hot water and overheated steam that are supplied from a steam generating vessel of an overheated steam generator.

Although a few embodiment of the present invention have been shown and described, it would be appreciated by those skilled in the art that changes may be made in this embodiment without departing from the principles and spirit of the invention, the scope of which is defined in the claims and their equivalents.

What is claimed is:

1. An overheated steam oven, comprising:
   a cabinet to define a cooking cavity therein;
   an overheated steam generator to supply overheated steam into the cooking cavity; and
   a cleaning unit to spray water from an interior of the overheated steam generator into the cooking cavity to clean an interior of the cooking cavity.

2. The overheated steam oven of claim 1, wherein the cleaning unit sprays the water heated by the overheated steam generator into the cooking cavity.

3. The overheated steam oven of claim 1, wherein the cleaning unit comprises:
   a plurality of spray nozzles provided in the cooking cavity;
   a feed pipe to connect a first drain hole provided on the overheated steam generator to the plurality of spray nozzles; and
   a feed pump mounted to a predetermined portion of the feed pipe to feed the water from the overheated steam generator to the plurality of spray nozzles through the feed pipe.

4. The overheated steam oven of claim 1, wherein the overheated steam generator comprises:
   a steam generating vessel having an outlet connected to the cooking cavity, and a predetermined amount of water contained in the steam generating vessel;
   a first heater mounted to a lower portion of the steam generating vessel; and
   a second heater mounted to an upper portion in the steam generating vessel to overheat steam generated by the first heater.

5. The overheated steam oven of claim 4, wherein the steam generating vessel further comprising an insulating vessel.

6. The overheated steam oven of claim 5, wherein the steam generating vessel further comprising:
   an inner vessel which contains the first heater and the second heater therein; and
   an outer vessel which surrounds an outer surface of the inner vessel is spaced apart from the outer surface of the inner vessel part, wherein a space between the inner vessel part and the outer vessel part is maintained in a vacuum state.

7. The overheated steam oven of claim 4, wherein the steam generating vessel further comprising:
   a feed hole to supply water from an external water source into an interior of the steam generating vessel; and
   a drain hole to supply the water from the interior of the steam generating vessel to the cleaning unit.

8. The overheated steam oven of claim 7, wherein the cleaning unit comprises:
a plurality of spray nozzles provided in the cooking cavity;
a feed pipe to connect the drain hole of the steam generating vessel to the plurality of spray nozzles; and
a feed pump mounted to a predetermined portion of the feed pipe to feed the water from the interior of the steam generating vessel to the plurality of spray nozzles through the feed pipe.

9. The overheated steam oven of claim 7, further comprising:
a water supply pipe extending from the external water source to the feed hole of the steam generating vessel; and
a control valve mounted to the water supply pipe to control supplying of the water fed from the external water source into the steam generating vessel.

10. The overheated steam oven of claim 4, further comprising:
a water level sensor installed in the steam generating vessel to monitor a level of the water contained in the steam generating vessel; and
a water temperature sensor installed in the steam generating vessel to monitor a temperature of the water contained in the steam generating vessel.

11. The overheated steam oven of claim 1, further comprising:
a steam inlet port provided on the cooking cavity and connected to the overheated steam generator; and
an inlet steam temperature sensor mounted to the steam inlet port to monitor a temperature of the overheated steam supplied into the cooking cavity through the steam inlet port.

12. The overheated steam oven of claim 1, further comprising:
an exhaust path provided at an upper portion in the cooking cavity to discharge steam from the cooking cavity to an outside of the cooking cavity; and
an outlet steam temperature sensor provided in the exhaust path to monitor a temperature of the steam discharged from the cooking cavity to the outside of the cooking cavity.

13. The overheated steam oven of claim 1, further comprising:
a drain pipe connected to a lower portion of the cooking cavity to drain the water from the cooking cavity to an outside of the cooking cavity; and
a drain pump mounted to the drain pipe.

14. The overheated steam oven of claim 1, further comprising a control panel provided at a predetermined portion of the cabinet, the control panel comprising:
a display to display an operational state of the overheated steam oven thereon;
a plurality of control keys and control switches to input cooking modes;
a cleaning key to control a cleaning operation; and
an alarm unit comprising an alarm lamp and an alarm speaker to inform the user of an execution of the cleaning operation.

15. The overheated steam oven of claim 3, further comprising:
a drain pipe extending from a second drain hole provided on a lower portion of the cooking cavity to an outside of the cabinet; and a drain pump mounted to a predetermined portion of the drain pipe.

16. The overheated steam oven of claim 6, wherein the steam generating vessel further comprising a shielding material which fills the space between the inner vessel and the outer vessel to intercept radiant heat originating from an interior of the steam generating vessel.

17. The overheated steam oven of claim 4, wherein the first heater and the second heater are spiral shaped to maximize a heat transferring area.

18. The overheated steam oven of claim 4, further comprising a cover having a plurality of steam discharging holes and mounted to an inner surface of a rear wall of the cooking cavity, wherein overheated steam flows from the overheated steam generator into the cooking cavity.

19. The overheated steam oven of claim 11, further comprising a bent part formed by bending an upper end of the steam generating vessel toward a rear wall of the cooking cavity, wherein the bent part is connected at a front end thereof on the outlet of the steam generating vessel to the steam inlet port provided on the rear wall of the cooking cavity.

20. A method of controlling an overheated steam oven having a cabinet to define a cooking cavity therein, an overheated steam generator to supply overheated steam into the cooking cavity, and a cleaning unit to spray water from an interior of the overheated steam generator into the cooking cavity to clean an interior of the cooking cavity, the method comprising:
spraying the water into the cooking cavity by use of the cleaning unit in response to a cleaning start signal and cleaning the interior of the cooking cavity by use of the water; and
supplying the overheated steam from the overheated steam generator into the cooking cavity and drying the interior of the cooking cavity by use of the overheated steam.

21. The method of claim 20, further comprising:
informing a user of an execution of a cleaning-mode operation when the spraying of the water into the cooking cavity is started in response to the cleaning start signal.

22. The method of claim 20, further comprising:
supplying steam into the cooking cavity and cleaning the interior of the cooking cavity by use of the steam, prior to the cleaning of the interior of the cooking cavity by use of the water.

23. The method of claim 22, wherein the cleaning of the interior of the cooking cavity by use of the steam further comprising:
maintaining a temperature of the steam supplied into the cooking cavity within a predetermined reference range;
operating a heater of the overheated steam generator when the temperature of the steam is lower than the predetermined reference range; and
stopping the heater of the overheated steam generator when the temperature of the steam is higher than the predetermined reference range.

24. The method of claim 23, wherein the predetermined reference range of the steam is set to 100° C.~110° C.

25. The method of claim 20, wherein the cleaning of the interior of the cooking cavity by use of the water further comprising:
cleaning the interior of the cooking cavity when a temperature of the water in the overheated steam generator is equal to or higher than a predetermined reference; and operating a heater of the overheated steam generator when the temperature of the water in the overheated steam generator is lower than the predetermined reference.

26. The method of claim 25, wherein the predetermined reference of the water is set to 60° C.

27. The method of claim 20, wherein the drying of the interior of the cooking cavity by use of the overheated steam further comprising:

operating a heater of the overheated steam generator, to supply the overheated steam having a temperature equal to or higher than a predetermined reference, into the cooking cavity.

28. The method of claim 27, wherein the predetermined reference of the overheated steam is set to 200° C.

29. The method of claim 20, wherein the cleaning start signal is input when a cleaning key provided on the cabinet is pressed for at least a predetermined period of time.

30. The method of claim 20, wherein the cleaning start signal is input when a cleaning key provided on the cabinet is repeatedly pressed at least a predetermined number of times.

* * * * *